US005558486A

United States Patent [19]

Paproski

[11] Patent Number: 5,558,486
[45] Date of Patent: Sep. 24, 1996

[54] SNOWMOBILE TRAILER WITH FRONT GRAVEL GUARDS

[76] Inventor: Vern Paproski, 801-45th Street West, Saskatoon, Saskatchewan, Canada, S7L 5X2

[21] Appl. No.: 385,693

[22] Filed: Feb. 8, 1995

[51] Int. Cl.⁶ .................................................. B65G 67/02
[52] U.S. Cl. ........................................ 414/537; 414/483
[58] Field of Search .................................. 414/537, 538, 414/483

[56] References Cited

U.S. PATENT DOCUMENTS

| 2,995,399 | 8/1961 | Riseborough | 414/483 |
| 3,757,972 | 9/1973 | Martin | 414/537 |
| 3,972,428 | 8/1976 | Love et al. | 414/537 |
| 3,989,148 | 11/1976 | Donohue | 414/537 |
| 4,014,444 | 3/1977 | Jakel | 414/537 |

OTHER PUBLICATIONS

Brochure by Newmans' Manufacturing Incorporated (6 pages).

*Primary Examiner*—Thomas J. Brahan
*Attorney, Agent, or Firm*—Adrian D. Battison; Murray E. Thrift

[57] ABSTRACT

A flat bed trailer for snowmobiles has a width sufficient to receive two snowmobiles side by side. A front edge of the flat bed trailer includes two portions inclined inwardly and forwardly to an apex on a center line of the trailer thus defining a triangular forward area for storage in front of the snowmobiles. Two gravel guards are provided in the form of flat panels which can be used for loading or as gravel guards. In the gravel guard position, each of the panels is mounted on a respective one of the front edge portions by posts at the edge of the panel which engage vertically into tubular pockets at the front edge portion. The length of the panels is equal to the length of the front edge portion so that at the apex the panels are squeezed together by a transverse rod. The panels can be removed from the guard position and used for unloading by engaging lugs at the end of the panels into loops at the rear beam of the trailer or into the tubular pockets. In this way the panels can be used side by side either at the front edge portion or at either side of the rear beam. The width of each panel is approximately equal to ¼ of the width of the trailer.

11 Claims, 3 Drawing Sheets

SNOWMOBILE TRAILER WITH FRONT GRAVEL GUARDS

BACKGROUND OF THE INVENTION

This invention relates to a snowmobile trailer of a type which includes gravel guards across front edge portions of the trailer to inhibit the discharge of road materials from the rear wheels of the towing vehicle onto the trailer.

Snowmobile trailers generally comprise a flat bed onto which the snowmobiles are loaded for transportation on the flat bed. Often the trailer is of sufficient width so that two snowmobiles can be arranged side by side on either side of a center line. A hitch at the forward end of the trailer on the center line attaches the trailer to a towing vehicle for transportation of the trailer with the snowmobiles on the trailer.

Most such snowmobile trailers are of a simple rectangular construction so that the front edge of the flat bed is exposed behind the towing vehicle and any road materials thrown up by the tires of the rear wheels of the towing vehicle pass up over the front edge and can impact the snowmobiles, at least causing soiling of the snowmobiles and in some cases causing damage.

SUMMARY OF THE INVENTION

It is one object of the present invention to provide an improved snowmobile trailer which includes front gravel guards which are mounted at the front edge to prevent or inhibit engagement of the snowmobiles by the gravel with those same guards being usable for loading of the snowmobiles onto and from the trailer.

According to one aspect of the invention there is provided a trailer for transporting snowmobiles comprising a trailer frame, ground wheels for supporting the frame for transportation across the ground, a hitch at a forward end of the frame for connection to a towing vehicle for pulling the trailer frame in a direction along a center line of the trailer frame, a flat bed mounted on the frame for receiving at least one snowmobile thereon, the flat bed having two parallel sides, a rear edge generally transverse to the center line and a front edge which includes two front edge portions inclined inwardly and forwardly from the sides to an apex at the centre line, two guard panels, each panel being substantially rectangular having two sides and two ends, first mounting means for readily and replaceably mounting of each of the panels on a respective one of the front edge portions with one side of the panel lying along the respective front edge portion and the panel standing upwardly from the front edge portion so that the panels provide guard surfaces across the front edge of the flat bed and second mounting means including mounting elements at the rear edge and at each of the front edge portions and arranged for readily removably and replaceably receiving one end of each of the panels such that the panels can be mounted side by side at a selected one of the rear edge and the front edge portions for loading or unloading a snowmobile.

Preferably the trailer includes means for coupling the panels when mounted on the first mounting means to hold the panels rigidly in position across the front edge. In one preferred arrangement, the coupling means comprises a rod extending through the panels and means for pulling along the length of the rod to pull the panels together with the rod extending horizontally, at right angles to the centre line and at a height approximately midway across the width of each panel.

Preferably the first mounting means includes a plurality of tubular pockets arranged at spaced positions along each of the front edge portions and a plurality of projecting stake members mounted on one side of the each of the panels so as to project outwardly from the side of the panel generally in a plane parallel to a plane of the panel for engagement into the pockets.

Preferably the second mounting means comprises a plurality of lug elements arranged at one end of each of the panels and a plurality of receptacles for the lug elements arranged at the rear edge and front edge portions of the flat bed, the receptacles at the front edge portions being defined by the tubular pockets.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 3:
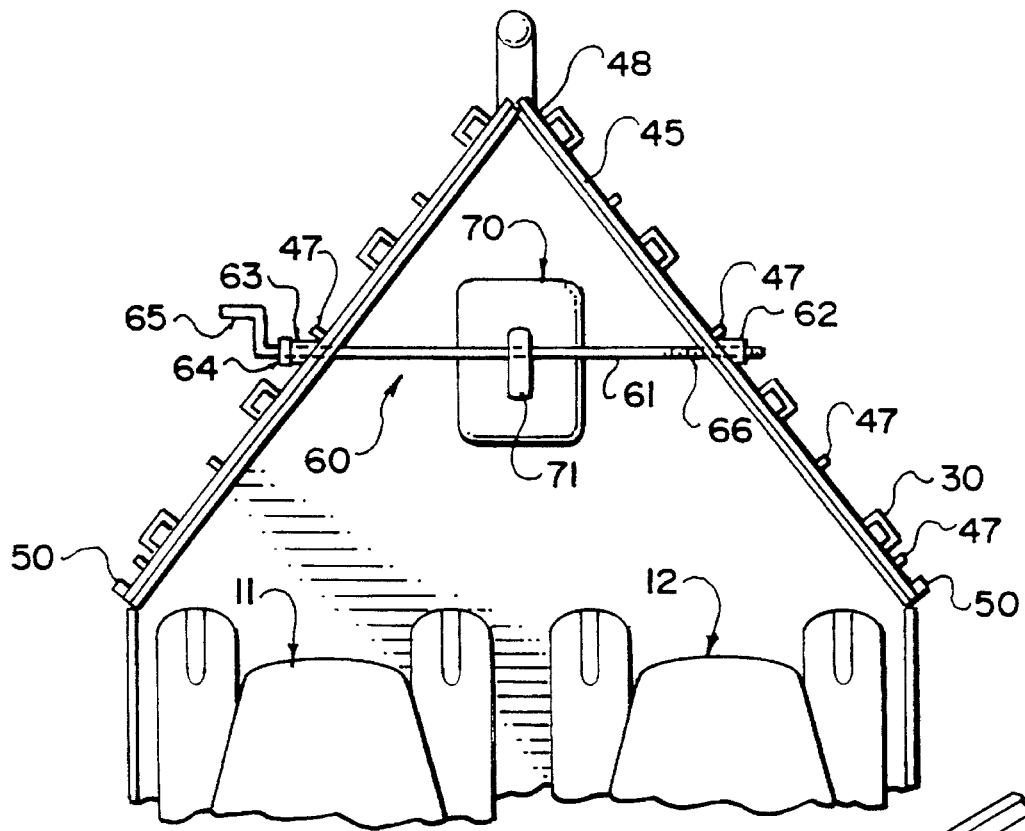
FIG. 3 is a top plan view showing the front only of the trailer with the front gravel guards in the position of FIG. 1.

The trailer of the present invention is generally indicated at 10 for transporting snowmobiles schematically indicated at 11 and 12 in FIG. 3. The trailer comprises generally a flat bed 13 formed by a flat sheet of suitable support material such as plywood which is carried on a frame 14. The frame includes ground wheels 15 mounted on an axle 16 for transportation of the frame and the trailer across the ground. The details of the frame and its connection to the axle, ground wheel and suitable suspension are not shown as these will be well known to one skilled in the art. Many designs and arrangements of such trailers are presently available and the present invention is not concerned with the particular style or arrangement of the frame and its support for the flat bed.

The frame connects to a hitch 17 positioned at a center line 18 of the frame so that when towed by a towing vehicle (not shown) the trailer moves in the direction parallel to the center line 18.

The flat bed 13 includes sides 19 and 20 which are parallel to the centre line 18 and spaced by the width of the trailer which is generally 8 feet so as to receive two snowmobiles 11 and 12 side by side across the width of the trailer. At each of the sides, the frame includes a raised flange 21 which extends along the full length of the side from the rear 22 of the flat bed to a front edge 23 of the side. The flange 21 is welded to the frame 14 so as to stand up from the flat bed 13 by a distance of the order of 2 to 3 inches. At the rear edge 22 of the flat bed is provided a main cross beam 23 of the frame which supports the rear edge of the flat bed. At the front of the flat bed, the flat bed includes two front edge portions 24 and 25 which converge inwardly toward an apex 26 on the centre line 18. Thus each front edge portion extends from the front end 23 of the respective side inwardly and forwardly to the apex 26. Along each front edge portion is provided a beam 27. The rear beam 23 and the beams 27 each have a vertical outer surface 23A, 27A exposed at or just beyond the edge of the flat bed.

On the outside surface 27A of each of the beams 27 is welded a plurality of tubular pockets 30 each arranged to define a tubular opening with a vertical axis for receiving a vertical post of the front guard. The tubular pockets 30 are spaced across the beam so that one is arranged adjacent the edge 23 and one is arranged adjacent the apex 26 with the others equidistantly spaced therebetween. The tubular pockets are formed by square tubing cut to a suitable length and welded to the outside surface with one flat side face of the square tubing against the outside surface of the beam.

At the rear beam 23 on the outside surface 23A thereof is provided a plurality of loops 31 which are again welded to the outside surface 23A. The loops 31 are again arranged so that one is adjacent the side 19 and the other is adjacent the side 20. The loops are arranged spaced equidistantly there across. The loops are formed by a simple rectangular metal piece with two legs extending outwardly from the surface 23A at right angles and interconnecting web parallel to the surface 23A. The loops thus form a horizontal opening.

Figure 4:
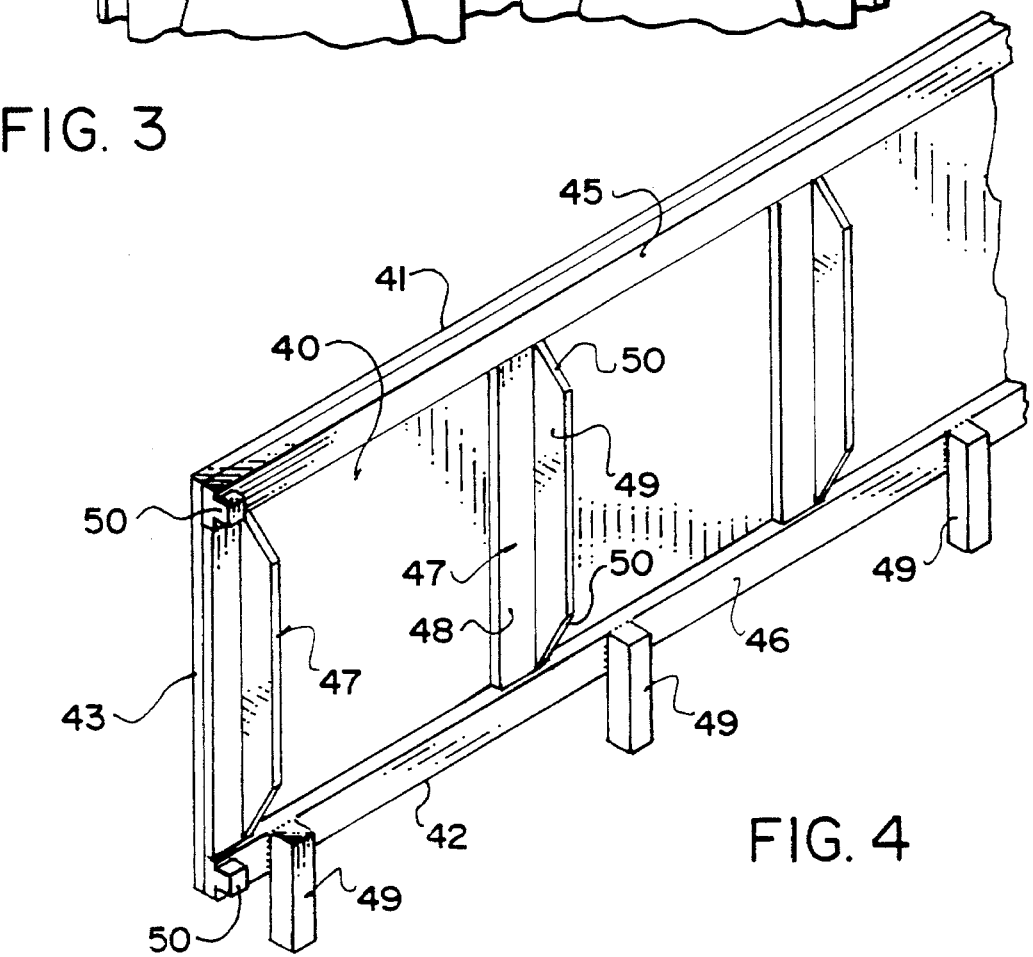
FIG. 4 is an isometric view of the undersurface or outer surface of one of the gravel guards.

One of the guard panels is shown in FIG. 4 and this comprises a base sheet 40 which is rectangular and formed of a suitable support material such as plywood. The base sheet has side edges 41 and 42 and end edges 43 and 44, the latter not being visible in FIG. 4. The side edges are reinforced on a lower or outer surface by two side straps 45 and 46 which are bolted to and along the respective side edges 41 and 42. The sheet is further reinforced by transfer reinforcement elements 47 at spaced positions along the length of the sheet. Each transverse stiffener 47 is formed as an angle iron with a flat strap flat 48 lying against the outer surface of the sheet and an outstanding flange 49 at right angles to the sheet. The flange 49 is chamfered at ends 50. The end most transverse stiffener indicated at 48 is formed as a flat strap similar to the straps 45 and 46 as opposed to the angle iron so that there is no flange projecting outwardly from the outer surface or undersurface of the panel. The strap 46 has a plurality of posts 49 welded thereto at spaced positions along the strap and extending outwardly from the side edge of the panel. The posts 49 are parallel and are formed by rods of square cross section with one flat side of the rod welded to the outside surface of the strap 46 which surface is parallel to the surface of the sheet 40. The posts 49 thus lie in a plane substantially parallel to the plane of the sheet 40 and are offset slightly from that plane.

At the end of each of the straps 45 and 46 is provided a lug 50 which is welded to the outside surface of the strap and projects away from the sheet. Each of the lugs is arranged at the end 43 of the panel, that is the end opposite to the flat stiffener 48.

Figure 1:
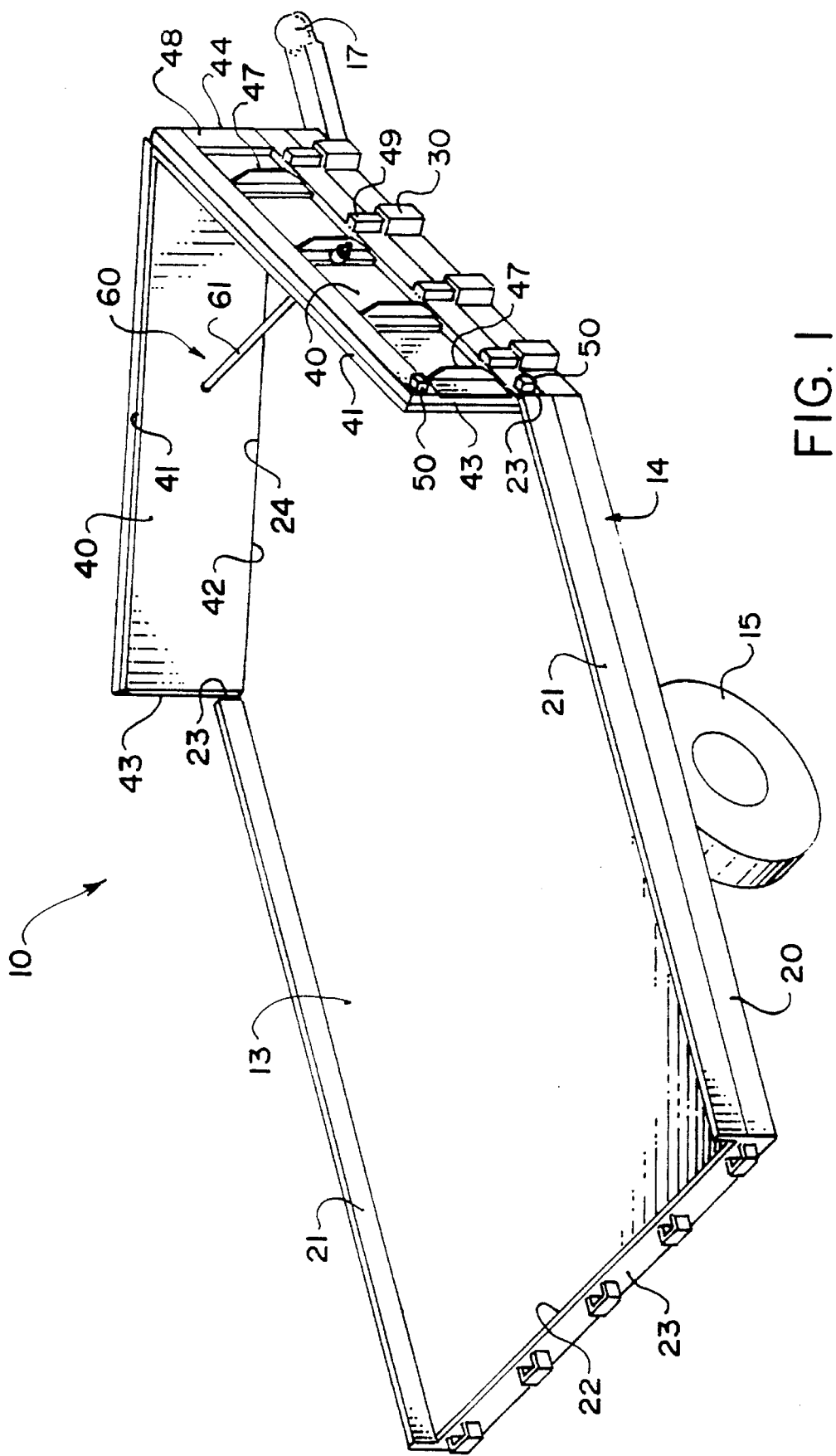
FIG. 1 is an isometric view of a trailer according to the present invention showing the front gravel guards in position at the front of the trailer.
Figure 2:
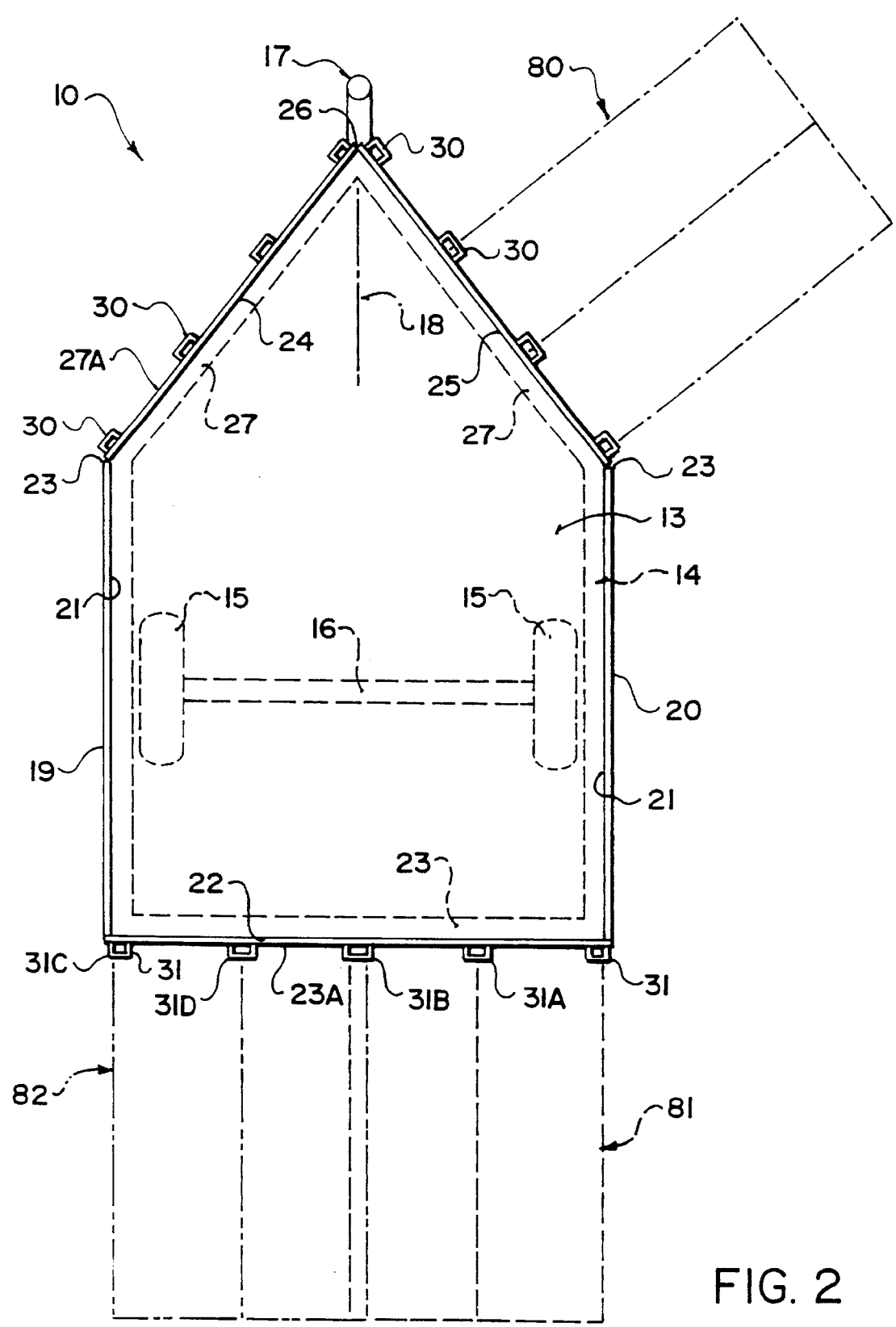
FIG. 2 is a top plan view of the trailer of FIG. 1 showing the front gravel guards removed and showing in dotted line a number of alternate positions for the guards.

In the position shown in FIGS. 1 and 3, the panels are mounted on the front edge portions 24 and 25. This mounting is effected by a first mounting means defined by the tubular pockets 30 and the posts 49. The spacing of the posts is arranged to be equal to the spacing of the tubular pockets so that the posts can simply slide into the tubular pockets when the edge 42 of the sheet is placed onto the top of the flat bed adjacent the front edge portion. The longitudinal reinforcing strap 46 also sits on the edge of the flat bed so as to provide a stable structure. The sheet stands vertically upwardly from the edge in view of the fact that the posts 49 are held vertical by the tubular pockets 30. The length of the panels is arranged to be equal to the length of the front edge portion so that the panels are engaged or abutting the edges 44 thereof which are positioned at the apex 26. The ends 43 of the panels extend to the front edge 23 of the sides so that the ends 43 of the panels do not extend beyond the sides 19 and 20 of the trailer.

In the position shown in FIGS. 1 and 3, the panels are held rigidly in place by a cross brace 60 comprising a rod 61 which passes through each of the panels at a middle one of the braces 47 and at a mid height of the panels. Each of the sheets 40 is thus drilled with a hole to receive the rod 61. The stiffener 47 of one of the panels carries a nut 62 which is welded to the stiffener at the required angle to receive the rod 61 along an axis of the nut 62. The other of the stiffeners 47 at the other of the panels has welded thereto a collar 63 through which the rod 61 passes. Against the collar is positioned a stop member 64 welded to the rod 61. On the end of the rod 61 is provided a cranking handle 65. In assembly, therefore, with the panels in position on the front edge portions, the rod 61 is inserted through the collar 63 until the end stop 64 abuts the collar 63. In this position the rod 61 is carefully passed through the opening in the other panel and engages the nut 62. Cranking of the handle 65 in the required direction thus engages the threaded end 66 of the rod 61 into the nut 62 to pull the panels inwardly toward one another thus tightening the abutment between the ends 44 of the panels.

In this position, the triangular section at the front of the trailer defines a storage area for receiving equipment associated with the snowmobiles for example a gas can 70. The height of the rod 61 is arranged so that it can pass through a handle 71 of the gas can so as to hold the gas can fixed in place without any possibility of it being released from the trailer.

It will be appreciated that the panels can be readily removed and replaced on the trailer simply by removing the coupling assembly 60 and by lifting the individual panels so that the posts are removed from the tubular pockets.

The lugs 50 are not used in the first mounting assembly for positioning the panels on the front edge of the trailer but are instead used as a second mounting assembly for utilizing the panels for loading and unloading the trailer. Thus the lugs 50 cooperate with the tubular pockets 30 when the panels are used at the front edge as indicated at 80. Also the lugs 50 cooperate with the loops 31 when the panels are used in a second position indicated at 81 or at a third position indicated at 82.

The length of the panels is equal to the length of the front edge portions and in practice with a trailer of the order of 8 feet in width, this length will be of the order of 6.5 feet. The width of each panel is arranged to be 2 feet since this is convenient for cutting from a supply of the plywood and since it is equal to approximately ¼ of the width of the trailer.

Thus it will be noted at a position shown at 81 and 82 at the rear edge of the trailer, the panels are arranged side by side in a position 81 adjacent the side 20 of the trailer. In the position 82 the panels are arranged at side by side at the side 19 of the trailer. In both of these positions the two panels arranged side by side extend across approximately one half of the width of the trailer so as to receive one of the snowmobiles for loading onto its adjacent or respective half of the trailer. The loops 31 are arranged at the rear beam 23 so that the loop adjacent the side 20 receives one of the lugs of one of the panels. A second one of the loops indicated at 31A receives the other lug of the panel and the lug of the adjacent panel. A third one of the loops as indicated at 31B is positioned centrally of the trailer. This loop receives the second lug of the second panel in the position indicated at 81.

In the position indicated at 82, the lugs are positioned symmetrically so that one of the panels has its outside lug in the loop 31C. The loop 31D carries the adjacent lugs at the centre line between the two panels. The lug 31B of course receives the other lug of the second panel.

The panels can also be used as indicated at 80 with the front edge portion 24 or with the front edge portion 25. In this position as shown at 80, the lugs 50 are engaged into the tubular pockets 30. In the symmetrical manner relatively to the loops 31, the tubular pockets 30 are spaced to receive the lugs so that three of the tubular pockets are used to receive the four lugs of the two side by side panels. The central one of the three tubular pockets receives two of the lugs. One of the pockets closely adjacent the end 23 of the side receives one of the lugs and the third tubular pocket which is spaced away from the apex 26 receives the other of the lugs.

In each of the positions 80, 81 and 82 which can be selected in accordance with requirements of the operator, the panels are inclined from the side edge of the trailer downwardly and outwardly to provide a ramp for loading or unloading. The end stiffener of the panels is simply a flat strap as indicated at 48 so that this can lie flat on the ground.

It will of course be appreciated that the panels can simply be inserted with the lugs into the receptacles of the second mounting assembly and can be readily removed for replacement as the gravel guards at the front edge of the trailer.

The panels can thus be used to load each of the snowmobiles at the rear edge by a placement of the panels at the positions 81 and 82 in turn and then the snowmobiles can be unloaded by forward movement from the trailer by use of the position indicated at 80.

The front gravel guards thus are cheaply and conveniently manufactured, are rigidly attached to the trailer when acting as front gravel guards by the coupling assembly and yet can be removed simply for loading and unloading of the trailer while allowing convenient loading at the rear of the trailer.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A trailer for transporting vehicles comprising:

a trailer frame;

ground wheels for supporting the frame for transportation across the ground;

a hitch at a forward end of the frame for connection to a towing vehicle for pulling the trailer frame in a direction along a center line of the trailer frame;

a flat bed mounted on the frame for receiving at least one vehicle thereon, the flat bed having two parallel sides, a rear edge generally transverse to the center line and a front edge which includes two front edge portions converging inwardly and forwardly from the sides to an apex at the center line;

two planar guard panels, each panel being substantially rectangular having two sides, two ends, a length between the ends and a width between the sides;

first mounting means for mounting each of the panels on a respective one of the front edge portions with one side of the panel lying along the respective front edge portion and the panel standing upwardly from the front edge portion so that the panels provide guard surfaces across the front edge of the flat bed;

the first mounting means comprising a plurality of tubular pockets arranged at spaced positions along each of the front edge portions and a plurality of projecting stake members mounted on one side of the each of the panels so as to project outwardly from the side of the panel generally in a plane parallel to a plane of the panel for readily releasable engagement into the pockets whereby the panels can be readily removed from the respective front edge portion;

the length of each panels being substantially equal to the length of the respective front edge portion and the panels being arranged such that when mounted by the first mounting means on the front edge portions, the adjacent ends of the panels are substantially in engagement at the apex and lie on a substantially vertical line at the apex;

and second mounting means including first mounting elements on one end of each panel and second mounting elements at the rear edge and at each of the front edge portions, the first and second mounting elements being arranged for readily removably and replaceably receiving said one end of each of the panels such that said one ends of the panels can selectively be located at one of the rear edge and the front edge portions for loading or unloading a vehicle;

the width of each of the panels being less than one half of the length of the front edge portions such that both panels can be mounted by said second mounting means side by side selectively on each of the front edge portions;

the width of each of the panels being less than one half of the length of the rear edge and the second mounting means including a first set of second mounting elements at one side of the rear edge and a second set of second mounting elements at an opposed side of the rear edge so as to receive the two panels side by side selectively at positions either at said one side of the rear edge or at said opposed side of the rear edge for loading or unloading vehicles for standing on the flatbed side by side.

2. The trailer according to claim 1 wherein the width of each panel is approximately equal to one quarter of the length of the rear edge.

3. The trailer according to claim 1 wherein the second mounting means comprises a plurality of lug elements arranged at one end of each of the panels and a plurality of receptacles for the lug elements arranged at the rear edge and front edge portions of the flat bed, the receptacles at the front edge portions being defined by the tubular pockets.

4. The trailer according to claim 1 wherein the second mounting means comprises a plurality of lug elements arranged a one end of each of the panels and a plurality of receptacles for the lug elements arranged at the rear edge and front edge portions of the flat bed.

5. A trailer for transporting vehicles comprising:

a trailer frame;

ground wheels for supporting the frame for transportation across the ground;

a hitch at a forward end of the frame for connection to a towing vehicle for pulling the trailer frame in a direction along a center line of the trailer frame;

a flat bed mounted on the frame for receiving at least one vehicle thereon, the flat bed having two parallel sides, a rear edge generally transverse to the center line and a front edge which includes two front edge portions converging inwardly and forwardly from the sides to an apex at the center line;

two planar guard panels, each panel being substantially rectangular having two sides, two ends, a length between the ends and a width between the sides;

first mounting means for mounting each of the panels on a respective one of the front edge portions with one side of the panel lying along the respective front edge portion and the panel standing upwardly from the front edge portion so that the panels provide guard surfaces across the front edge of the flat bed;

the first mounting means comprising a plurality of tubular pockets arranged at spaced positions along each of the front edge portions and a plurality of projecting stake members mounted on one side of the each of the panels so as to project outwardly from the side of the panel generally in a plane parallel to a plane of the panel for readily releasable engagement into the pockets whereby the panels can be readily removed from the respective front edge portion;

the length of each panels being substantially equal to the length of the respective front edge portion and the panels being arranged such that when mounted by the first mounting means on the front edge portions, the adjacent ends of the panels are substantially in engagement at the apex and lie on a substantially vertical line at the apex;

second mounting means including first mounting elements on one end of each panel and second mounting elements at the rear edge and at each of the front edge portions, the first and second mounting elements being arranged for readily removably and replaceably receiving said one end of each of the panels such that said one ends of the panels can selectively be located at one of the rear edge and the front edge portions for loading or unloading a vehicle;

the width of each of the panels being less than one half of the length of the front edge portions such that both panels can be mounted by said second mounting means side by side selectively on each of the front edge portions;

the width of each of the panels being less than one half of the length of the rear edge and the second mounting means including a first set of second mounting elements at one side of the rear edge and a second set of second mounting elements at an opposed side of the rear edge so as to receive the two panels side by side selectively at positions either at said one side of the rear edge or at said opposed side of the rear edge for loading or unloading vehicles for standing on the flatbed side by side;

and means for coupling the panels when mounted on the first mounting means to hold the panels rigidly in position across the front edge, said coupling means being arranged to pull the panels together so as to engage the ends of the panels together at the vertical line.

6. The trailer according to claim 5 wherein the coupling means comprises a rod extending through the panels and means for pulling along the length of the rod to pull the panels together.

7. The trailer according to claim 6 wherein the rod extends horizontally and at right angles to the centre line.

8. The trailer according to claim 6 wherein the rod is arranged at a height approximately midway across the width of each panel.

9. The trailer according to claim 5 wherein each panel includes a rectangular panel member of sheet material and a plurality of stiffener members including longitudinal stiffener members along the sides of the panel member and transverse stiffener members at spaced positions along the length of the panel member.

10. The trailer according to claim 5 wherein the second mounting means comprises a plurality of lug elements arranged at one end of each of the panels and a plurality of receptacles for the lug elements arranged at the rear edge and front edge portions of the flat bed.

11. The trailer according to claim 5 wherein the second mounting means comprises a plurality of lug elements arranged at one end of each of the panels and a plurality of receptacles for the lug elements arranged at the rear edge and front edge portions of the flat bed, the receptacles at the front edge portions being defined by the tubular pockets.

* * * * *